United States Patent
Auer et al.

(10) Patent No.: US 9,686,804 B2
(45) Date of Patent: Jun. 20, 2017

(54) METHOD AND NETWORK NODE FOR ASSISTING HANDLING OF INTERFERENCE AT A RECEIVER DEVICE

(71) Applicant: Telefonaktiebolaget L M Ericsson (publ), Stockholm (SE)

(72) Inventors: Gunther Auer, Stockholm (SE); Peter Björkén, Solna (SE); Mattias Frenne, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/890,226

(22) PCT Filed: May 23, 2013

(86) PCT No.: PCT/SE2013/050591
§ 371 (c)(1),
(2) Date: Nov. 10, 2015

(87) PCT Pub. No.: WO2014/189421
PCT Pub. Date: Nov. 27, 2014

(65) Prior Publication Data
US 2016/0128081 A1    May 5, 2016

(51) Int. Cl.
*H04W 72/00* (2009.01)
*H04W 72/12* (2009.01)
(Continued)

(52) U.S. Cl.
CPC .............. *H04W 72/12* (2013.01); *H04B 1/12* (2013.01); *H04J 11/005* (2013.01);
(Continued)

(58) Field of Classification Search
CPC .. H04W 72/12; H04W 72/082; H04L 5/0023; H04L 5/0092; H04L 5/0073; H04L 25/03891; H04J 11/005; H04B 1/12
(Continued)

(56) References Cited

U.S. PATENT DOCUMENTS 6,223,040 B1    4/2001  Dam
7,269,238 B2    9/2007  Lee et al.
(Continued)

FOREIGN PATENT DOCUMENTS

WO    0213439 A2    2/2002
WO    2009031949 A1    3/2009

OTHER PUBLICATIONS

Karlsson, J. et al., "Interference Rejection Combining for GSM", 5th IEEE International Conference on Universal Personal Communications, Sep. 29, 1996, pp. 433-437, vol. 1, IEEE.
(Continued)

*Primary Examiner* — Khai M Nguyen
(74) *Attorney, Agent, or Firm* — Coats and Bennett, PLLC (57) ABSTRACT

It is presented a method for assisting handling of interference at a receiver device. The method is performed in a network node and comprises the steps of: determining a parameter indicating a maximum number of interfering streams for which interference suppression is likely to be successful at the receiver device; determining that a number of potentially interfering streams at the receiver device exceeds the maximum number of interfering streams indicated by the parameter; and scheduling transmissions to avoid that the number of concurrent interfering streams at the receiver device exceeds the maximum number of interfering streams indicated by the parameter. A corresponding network node is also presented.

20 Claims, 4 Drawing Sheets

(51) Int. Cl.
  *H04J 11/00* (2006.01)
  *H04B 1/12* (2006.01)
  *H04W 72/08* (2009.01)
  *H04L 5/00* (2006.01)
  *H04L 25/03* (2006.01)

(52) U.S. Cl.
  CPC ......... *H04W 72/082* (2013.01); *H04L 5/0023* (2013.01); *H04L 5/0073* (2013.01); *H04L 5/0092* (2013.01); *H04L 25/03891* (2013.01)

(58) Field of Classification Search
  USPC ........... 455/450, 452.1, 452.2, 453; 370/329, 370/431
  See application file for complete search history.

(56) References Cited

U.S. PATENT DOCUMENTS

| | | | |
|---|---|---|---|
| 2003/0026223 A1 | 2/2003 | Eriksson et al. | |
| 2003/0142640 A1 | 7/2003 | Pajukoski et al. | |
| 2004/0092281 A1* | 5/2004 | Burchfiel | H04B 7/0408 455/522 |
| 2006/0223540 A1 | 10/2006 | Chuang et al. | |
| 2007/0173271 A1 | 7/2007 | Hulkkonen et al. | |
| 2007/0297495 A1* | 12/2007 | Visoz | H04B 7/005 375/148 |
| 2008/0009256 A1* | 1/2008 | Anderson | H04W 72/085 455/296 |
| 2010/0080163 A1* | 4/2010 | Krishnamoorthi | H04L 12/189 370/312 |
| 2011/0182256 A1* | 7/2011 | Fodor | H04B 7/024 370/329 |
| 2012/0113794 A1* | 5/2012 | Roman | H04B 7/0452 370/201 |
| 2012/0155411 A1 | 6/2012 | Ancora et al. | |
| 2013/0157704 A1* | 6/2013 | Abe | H04J 11/005 455/501 |
| 2013/0324136 A1* | 12/2013 | Hirata | H04W 16/32 455/447 |
| 2016/0226538 A1* | 8/2016 | Kim | H04B 1/123 |

OTHER PUBLICATIONS

Craig, S., et al., "A System Performance Evaluation of 2-Branch Interference Rejection Combining", IEEE 56th Vehicular Technology Conference, Proceedings, Jan. 1, 2002, pp. 1887-1891, vol. 3, IEEE.

* cited by examiner

METHOD AND NETWORK NODE FOR ASSISTING HANDLING OF INTERFERENCE AT A RECEIVER DEVICE

TECHNICAL FIELD

The technology relates to a method and network node for assisting handling of interference at a receiver device.

BACKGROUND

Contemporary mobile communications networks allow any base station to access all available radio resources within the network. Allowing for such a universal frequency reuse significantly boosts the capacity of a wireless network, as compared to networks that impose a static frequency reuse. One major drawback of universal frequency reuse is that users located near the cell boundary experience high out-of-cell interference originating from neighbouring transmissions.

In order to mitigate the detrimental effects of inter-cell interference for cell-edge users, it is known in the art to use interference suppression, where the receiver attempts to cancel interference. However, interference suppression is limited in how many interference sources can be handled. Also, interference suppression is not efficient for interference sources for which poor or no channel estimates exists.

It would be beneficial if there were to be some way to improve handling of interference from what is known in the prior art.

SUMMARY

An object is to eliminate or at least alleviate the problems of the prior art discussed above.

According to a first aspect, it is presented a method for assisting handling of interference at a receiver device. The method is performed in a network node and comprises the steps of: determining a parameter indicating a maximum number of interfering streams for which interference suppression is likely to be successful at the receiver device; determining that a number of potentially interfering streams at the receiver device exceeds the maximum number of interfering streams indicated by the parameter; and scheduling transmissions to avoid that the number of concurrent interfering streams at the receiver device exceeds the maximum number of interfering streams indicated by the parameter. In this way, the interference suppression is more likely to be successful, which reduces the effect of interference and improves throughput.

The receiver device may comprise multiple receive antennas. In such a case, in the step of determining, the parameter is calculated by subtracting the number of streams intended for the receiver device from a number of receive antennas of the receiver device. This is an effective way to calculate the parameter, effectively giving the degrees of freedom for the receiver device.

The method may further comprise the step, prior to the step of scheduling, of: selecting a scheduling set of at least one transmission stream from the potentially interfering streams. In such a case, the step of scheduling comprises scheduling the at least one transmission stream in the scheduling set to avoid interference at the receiver device between the at least one transmission stream in the scheduling set with other streams of the potentially interfering streams. In other words, a surplus of streams, from the perspective of interference suppression ability, are assigned, e.g. at another time/frequency resource block, so to avoid interference that cannot be handled at the receiver device.

The step of selecting a scheduling set of at least one transmission stream may comprise selecting streams based on which streams are less likely to be successfully suppressed at the receiver device. In this way, the likelihood of the interference suppression to be successful is improved.

The step of selecting a scheduling set of at least one transmission stream may comprise selecting at least one stream which has a weak signal at the receiver device compared to other streams and/or at least one stream which is transmitted from a source which is similar in direction from the receiver device compared to a source of streams intended for the receiver device. Such transmission streams are less likely to be successfully interference suppressed, whereby it is better to include such streams in the scheduling set.

The step of selecting a scheduling set of at least one transmission stream may comprise using indications of performance gain from the receiver device. This is one effective way of evaluating what streams are significant interference sources for the receiver device.

The step of selecting a scheduling set of at least one transmission stream may comprise selecting streams based on which streams have a lower priority.

The step of scheduling may comprise the use of inter-cell interference coordination. This is a way of scheduling streams of the scheduling set at The step of scheduling transmissions may comprise reducing a rank of an interfering source to a reduced, non-zero rank. This may reduce the throughput of the interfering source, but by reducing interference, the system throughput can still be increased.

The receiver device may be a wireless device. In such a case, the step of scheduling comprises scheduling downlink transmissions to the wireless device.

The network node may be distinct from any serving network node transmitting streams intended for the receiver device.

The receiver device may be the network node. In such a case, the step of scheduling comprises scheduling uplink transmissions from a wireless device.

In the step of determining, the potentially interfering streams may be estimated to have a power level which is greater than a threshold power value. This is one way of only including significant interferers.

According to a second aspect, it is presented a network node for assisting handling of interference at a receiver device. The network node comprises: a processor; and a memory storing instructions that, when executed by the processor, causes the network node to: determine a parameter indicating a maximum number of interfering streams for which interference suppression is likely to be successful at the receiver device determine that a number of potentially interfering streams at the receiver device exceeds the maximum number of interfering streams indicated by the parameter; and schedule transmissions to avoid that the number of concurrent interfering streams at the receiver device exceeds the maximum number of interfering streams indicated by the parameter.

The receiver device may comprise multiple receiver antennas, in which case the instructions to determine comprise instructions to calculate the parameter by subtracting the number of streams intended for the receiver device from a number of receive antennas of the receiver device.

The network node may further comprise instructions to: select a set of at least one transmission stream from the potentially interfering streams, in which case the instructions to schedule comprise instructions to schedule the at least one transmission stream in the scheduling set to avoid interference at the receiver device between the at least one transmission stream in the scheduling set with other streams of the potentially interfering streams.

The instructions to select a set of at least one transmission stream may comprise instructions to select streams based on which streams are less likely to be successfully suppressed at the receiver device.

The instructions to select a set of at least one transmission stream may comprise instructions to select at least one stream which has a weak signal at the receiver device compared to other streams and/or at least one stream which is transmitted from a source which is similar in direction from the receiver device compared to a source of streams intended for the receiver device.

The instructions to select a set of at least one transmission stream may comprise instructions to use indications of performance gain from the receiver device.

The instructions to select a set of at least one transmission stream may comprise instructions to select streams based on which streams have a lower priority.

The instructions to schedule may comprise instructions to use inter-cell interference coordination.

The instructions to schedule transmissions may comprise instructions to reduce a rank of an interfering source to a reduced, non-zero rank.

The receiver device may be a wireless device, in which case the instructions to schedule comprise instructions to schedule downlink transmissions to the wireless device.

The network node may be distinct from any serving network node transmitting streams intended for the receiver device.

The receiver device may be the network node, in which case the instructions to schedule comprise scheduling uplink transmissions from a wireless device.

The instructions to determine may include instructions such that the potentially interfering streams are only potentially interfering streams which are estimated to have a power level which is greater than a threshold power value.

According to a third aspect, it is presented a network node comprising: means for determining a parameter indicating a maximum number of interfering streams for which interference suppression is likely to be successful at the receiver device; means for determining that a number of potentially interfering streams at the receiver device exceeds the maximum number of interfering streams indicated by the parameter; and means for scheduling transmissions to avoid that the number of concurrent interfering streams at the receiver device exceeds the maximum number of interfering streams indicated by the parameter.

In the means for determining, the parameter is calculated by subtracting the number of streams intended for the receiver device from a number of receive antennas of the receiver device, wherein the receiver device may comprise multiple receive antennas.

The network node may further comprise means for selecting a scheduling set of at least one transmission stream from the potentially interfering streams. In such a case, the means for scheduling comprises means for scheduling the at least one transmission stream in the scheduling set to avoid interference at the receiver device between the at least one transmission stream in the scheduling set with other streams of the potentially interfering streams.

The means for selecting a scheduling set of at least one transmission stream may comprise means for selecting streams based on which streams are less likely to be successfully suppressed at the receiver device.

The means for selecting a scheduling set of at least one transmission stream may comprise means for selecting at least one stream which has a weak signal at the receiver device compared to other streams and/or at least one stream which is transmitted from a source which is similar in direction from the receiver device compared to a source of streams intended for the receiver device.

The means for selecting a scheduling set of at least one transmission stream may comprise means for using indications of performance gain from the receiver device.

The means for selecting a scheduling set of at least one transmission stream may comprise means for selecting streams based on which streams have a lower priority.

The means for scheduling may comprise means for using of inter-cell interference coordination.

The means for scheduling transmissions may comprise means for reducing a rank of an interfering source to a reduced, non-zero rank.

The means for scheduling may comprise means for scheduling downlink transmissions to the receiver device, being a wireless device.

The network node may be distinct from any serving network node transmitting streams intended for the receiver device.

The means for scheduling may comprise means for scheduling uplink transmissions from a wireless device, whereby the receiver device is the network node.

The means for determining may comprise means for estimating the potentially interfering streams to have a power level which is greater than a threshold power value.

It is to be noted that any feature of the first, second and third aspects may, where appropriate, be applied to any other of these aspects.

The word 'plurality' in the description and claims is to be interpreted as meaning 'more than one'.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
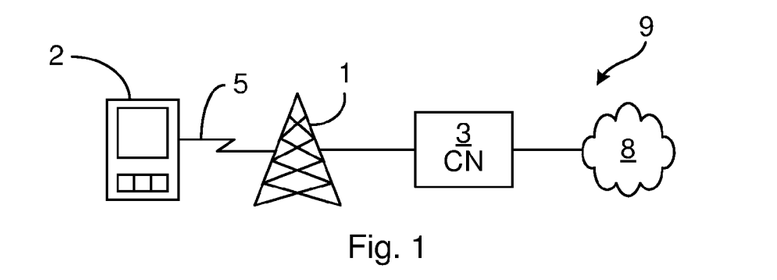
FIG. 1 is a schematic diagram illustrating an environment where embodiments presented herein can be applied.

FIG. 1 is a schematic diagram illustrating an environment where embodiments presented herein can be applied. A mobile communications network 9 comprises a core network 3 and a radio access network comprising one or more network nodes 1 and optionally one or more radio network controllers (not shown). The network nodes 1, are here in the form of evolved Node Bs also known as eNBs but could also be in the form of Node Bs (NodeBs/NBs) and/or BTSs (Base Transceiver Stations) and/or BSSs (Base Station Subsystems), etc. The network nodes 1 provide radio connectivity to a plurality of wireless devices 2. The term wireless device is also known as user equipment (UE), mobile terminal, user terminal, user agent, etc.

Each one of the network nodes 1 provides radio coverage in one or more respective radio cells. Uplink (UL) communication, from the wireless device 2 to the network node 1, and downlink (DL) communication, from the network node 1 to the wireless device 2 occur over a wireless radio interface 5. The radio conditions of the wireless radio interface 5 vary over time and also depends on the position of the wireless device 2, due to effects such as interference, fading, multipath propagation, etc.

The core network 3 provides access to central functions in the mobile communication network and connectivity to other communication networks 8.

The mobile communications network 9 may e.g. comply with any one or a combination of LTE (Long Term Evolution), UMTS utilising W-CDMA (Wideband Code Division Multiplex), CDMA2000 (Code Division Multiple Access 2000), or any other current or future wireless network, as long as the principles described hereinafter are applicable. Nevertheless, LTE will be used below to fully illustrate a context in which embodiments presented herein can be applied.

Figure 2:
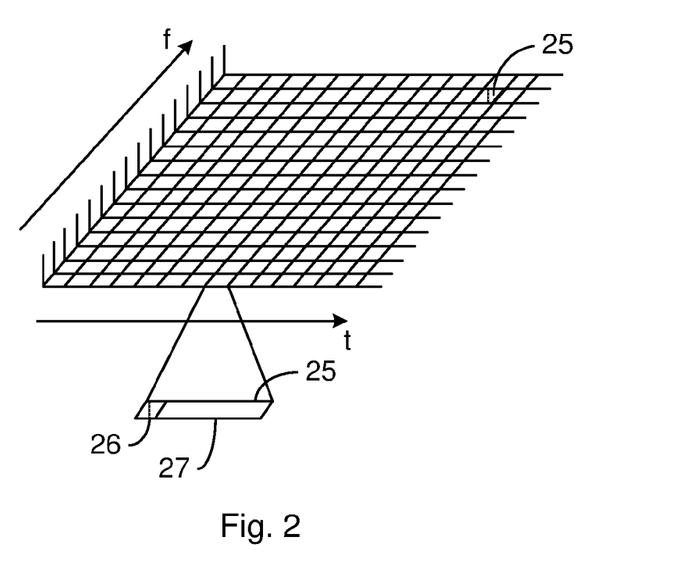
FIG. 2 is a schematic diagram illustrating the physical resources for LTE (Long Term Evolution) downlink.

FIG. 2 is a schematic diagram illustrating the physical resources for downlink communication in LTE (Long Term Evolution). Downlink communication is communication from a network node to a wireless device. LTE uses OFDM (Orthogonal Frequency Division Multiplexing) in the downlink and DFT (Discrete Fourier Transform)-spread OFDM in the uplink. The basic LTE downlink physical resource can thus be seen as a time-frequency grid as illustrated in FIG. 2, where each resource element 25 corresponds to one OFDM subcarrier during one OFDM symbol interval. Each resource element 25 comprises cyclic prefix section 26 and a main section 27.

Figure 3:
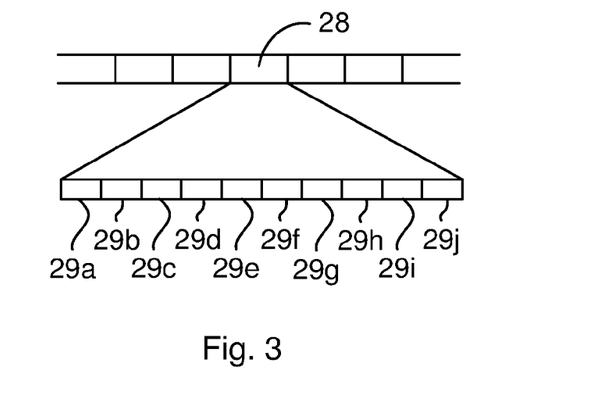
FIG. 3 is a schematic diagram illustrating LTE time-domain structure.

FIG. 3 is a schematic diagram illustrating LTE time-domain structure. In the time domain, LTE downlink transmissions are organised into radio frames 28 of 10 ms, each radio frame consisting of ten equally-sized subframes 29a-j of length $T_{subframe}=1$ ms, as can be seen in FIG. 3.

Figure 4:
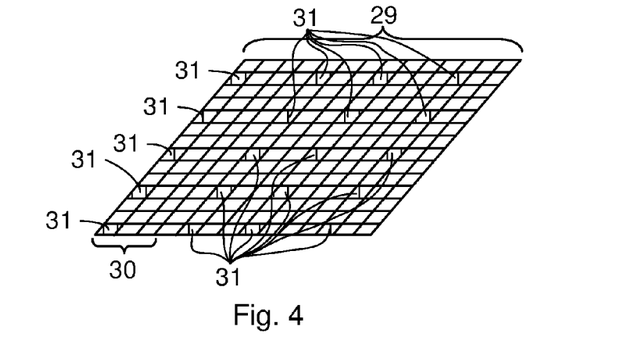
FIG. 4 is a schematic diagram illustrating a downlink subframe.

FIG. 4 is a schematic diagram illustrating a downlink subframe. The resource allocation in LTE is typically described in terms of resource blocks (RB), where a resource block can correspond to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about to which terminals data is transmitted and upon which resource blocks the data is transmitted, in the current downlink subframe. This control signaling is typically transmitted in a control region 30 in the first one, two, three or four OFDM symbols in each subframe and the number n=1, 2, 3 or 4 is known as the Control Format Indicator (CFI), thus indicating the number of OFDM symbols being part of the control region 30. The downlink subframe also contains common reference signals (CRS) 31, which are known to the receiver and used for coherent demodulation of, e.g., the control information. A downlink system with CFI=3 OFDM symbols as control for a subframe 29 is illustrated in FIG. 4.

Figure 5:
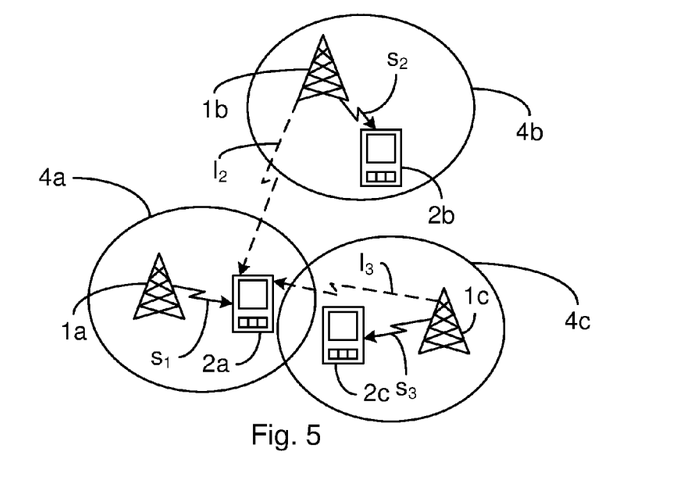
FIG. 5 is a schematic diagram illustrating downlink interference in a system of the structure of FIG. 1.

FIG. 5 is a schematic diagram illustrating downlink interference in a system of the structure of FIG. 1. The components of FIG. 5 are equivalent to the components of FIG. 1.

A first network node 1a provides coverage in a first cell 4a, a second network node 1b provides coverage in a second cell 4b, and a third network node 1c provides coverage in a third cell 4c.

A first wireless device 2a receives a first downlink signal $S_1$ from the first network node 1a in the first cell 4a. A second wireless device 2b receives a second downlink signal $S_2$ from the second network node 1b in the second cell 4b. A third wireless device 2c receives a third downlink signal $S_3$ from the third network node 1c in the third cell 4c. However, looking from the perspective of the first wireless device 2a, the second downlink signal $S_2$ also results in a first interfering downlink signal $I_2$ and the third downlink signal $S_3$ also results in a second interfering downlink signal $I_3$. It is to be noted that each interfering signal can be one or more streams, and each stream is in such a case an interfering stream.

Downlink interfering signals also exist for the second wireless device 2b and the third wireless device 2C, but these interfering signals are omitted in FIG. 5 for reasons of clarity.

Figure 6:
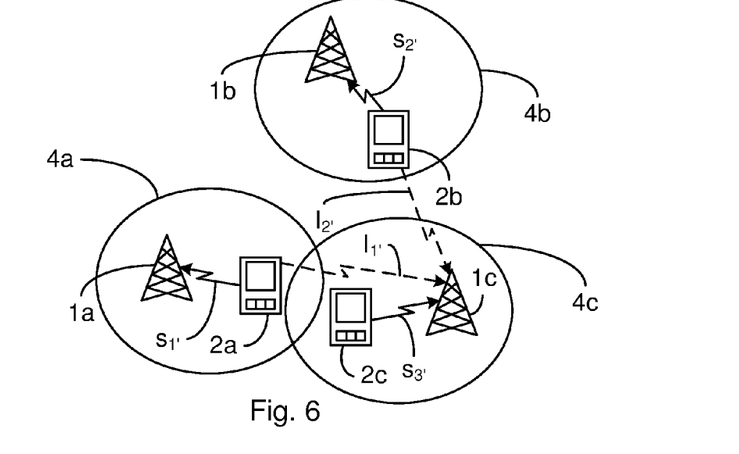
FIG. 6 is a schematic diagram illustrating uplink interference in a system of the structure of FIG. 1.

FIG. 6 is a schematic diagram illustrating uplink interference in a system of the structure of FIG. 1. Here, the first network node 1a receives a first uplink signal $S_1'$ from the first wireless device 2a, the second network node 1b receives a second uplink signal $S_2'$ from the second wireless device 2b and the third network node 1c receives a third uplink signal $S_3'$ from the third wireless device 2c. However, looking from the perspective of the third network node 1c, the first uplink signal $S_1'$ also results in an first interfering uplink signal $I_1'$ and the second uplink signal $S_2'$ also results in a second interfering uplink signal $I_2'$. Uplink interfering signals also exist for the second network nodes 2b and the third network node 2C, but these interfering signals are omitted in FIG. 6 for reasons of clarity.

It will now be described two ways in which the effects of interference can be reduced in the receiver device, namely interference suppression and interference coordination. In downlink, shown in FIG. 5, the receiver device is one of the wireless devices and in uplink, shown in FIG. 6, the receiver device is one of the network nodes.

In interference suppression, the receiver device attempts to suppress the interference. The receiver device is equipped with multiple receive antennas, whereby beamforming can be utilised so to steer a spatial null in the direction of a significant interferer. This is also known as interference rejection combining (IRC). For IRC the weights of the receive antennas are adjusted so to optimise a trade-off between maximising the antenna gain to the desired transmission source, while minimising the received interference signal.

IRC uses an estimate of an interference covariance matrix to indicate the channels of the interferers. One method to calculate the interference covariance matrix is by forming an estimate of the instantaneous channel responses of the desired signal and then subtracting it from the total received signal and perform averaging of the covariance of the residual over a number of resources, for instance resource elements or resource blocks.

Unfortunately, the attainable gains of interference suppression techniques critically depend on the characteristics of the interfering source(s), as well as on the accuracy of the channel estimates. For instance, if the interfering and the intended signals impinge from similar directions, IRC will not be able to suppress the interferer without also degrading the intended signal. Likewise, poor channel estimates might result in an inaccurate interference covariance matrix estimate, which may cause severe performance degradation. Hence, IRC is more effective when channel estimates are better, which occurs when the interfering signal is strong. Note that 'direction' need not necessarily mean a physical, angular, direction, but could also mean a generalized angular direction in the multi-dimensional received signal subspace, where the number of dimensions is determined by the number of received antennas.

Furthermore, the performance of IRC degrades if the number of impinging signals of significant power and separable arrival directions exceeds the number of receive antennas (i.e. receive dimensions) $N_{Rx}$, i.e. the number of interferers plus the intended signal exceed $N_{Rx}$.

Now the concept of inter-cell interference coordination (ICIC) will be explained. This is based on network nodes coordinating to mute certain time-frequency resources, so that receivers in adjacent cells experience less out-of-cell interference.

This works e.g. in LTE, which is based OFDMA and has the time-frequency resources called physical resource blocks (PRBs) as explained above. The PRBs may be muted, i.e. no signal is transmitted, or only mandatory signals, such as a common reference signals (CRS), are transmitted. This helps cell-edge users in adjacent cells to detect data from their serving cell with improved signal quality. However, interference coordination (ICIC) incurs a penalty on the network capacity, since some resources must be left idle during the muting.

Alternatively, ICIC may restrict the transmission power of potential interferers. In other words, a certain time-frequency resource is not completely muted, but the transmit power of the data transmission is reduced to some extent, while CRS maintains full power.

ICIC generally requires information exchange between adjacent network nodes for the coordination, e.g. through an X2 interface.

Looking now at both IRC and ICIC, it is beneficial to use IRC whenever possible, since this does not degrade throughput in the adjacent cells, and then use ICIC for such interfering streams which the receiver device are unable, or unlikely, to succeed at suppressing using IRC.

ICIC is thus used to reduce the number of significant interferers of a given user U, so that residual significant interference can be suppressed by IRC. By doing so, the receiver only sees interference it is able to suppress. In this context it is meaningful to define a parameter indicating a maximum number of interfering streams for which interference suppression is likely to be successful at the receiver device. In this example, this parameter is equal to an IRC degree of freedom din, defined as:

$$d_{IRC} = N_{Rx} - S_U \quad [1]$$

where $N_{Rx}$ denotes the number of receive antennas of the receiver device in question and $S_U$ denotes the number of spatial streams intended for user U of the receiver device in question. The parameter $d_{IRC}$ thus indicates the maximum number of streams for which interference suppression is likely to be successful. Note that in the uplink, the user U is a network node and $S_U$ indicates the sum of the number of desired received streams at the network node (which may be a collection of desired streams from more than one UE in the cell). It is to be noted that IRC is here only an example of an interference suppression functionality. The actual algorithm and processing used to perform such interference suppression may any suitable functionality, such as the classical interference rejection algorithm, but it may equally well be serial interference cancellation algorithms or parallel interference cancellation algorithms. It may also be more advanced interference removal algorithms that is based on demodulating and detecting the interfering signal before removal. Hence, the use of IRC here should be seen in a general sense, covering all families of interference removal, suppression and rejection algorithms.

Figure 7A:
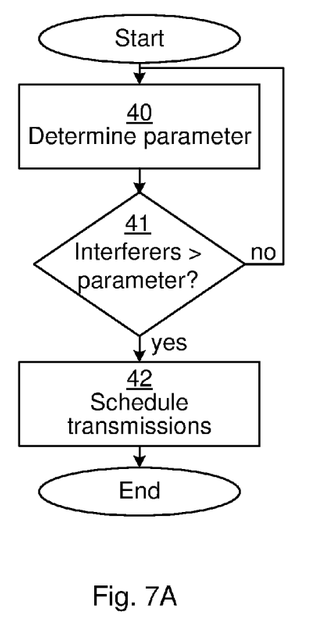
FIGS. 7A-B are flow charts illustrating methods for assisting handling of interference at a receiver device being either a network node or wireless device of FIGS. 1, 5 and 6.

FIG. 7A is a flow chart illustrating a method for assisting handling of interference at a receiver device being either a network node or wireless device of FIGS. 1, 5 and 6, according to one embodiment. The method is performed in the network node 1 of FIG. 1. The method is executed for a particular receiver device and can be executed independently, in parallel, for a plurality of receiver devices.

In a determine parameter step 40, the network node determines a parameter indicating a maximum number of interfering streams for which interference cancellation is likely to be successful at the receiver device.

In one embodiment, the parameter is calculated by subtracting the number of streams intended for the receiver device from a number of receive antennas of the receiver device, giving a measurement of degrees of freedom, denoted dim above.

The number of potentially interfering streams is the number of interfering streams within range of the receiver device which are expected to transmit over the same radio resource, e.g. time and frequency clock, as the intended stream.

In a conditional interferers>parameter step 41, it is checked whether a number of potentially interfering streams at the receiver device exceeds the maximum number of interfering streams indicated by the parameter. If this is the case, the method continues to a schedule transmissions step 42. Otherwise, the method returns to the determine parameter step 40.

In one embodiment, the potentially interfering streams are only those having an estimated power level which is greater than a threshold power value. In other words, only significant interfering streams are considered to be potentially interfering streams.

The condition that determines whether an interferer is classified as significant may depend on several factors. This could be based on an end-user requirement, e.g. a certain data rate is needed that cannot be accomplished given the current interference scenario.

Interference estimation can also be based on reference signal received power (RSRP) measurements, where the wireless device (in downlink) reports the strongest signals in its surrounding.

The SINR (Signal to Interference plus noise) can be estimated by:

$$SINR = \frac{S}{\sum I_x + N} \quad [2]$$

where $I_x$ denotes the power of an interfering stream at the receiver device, S denotes the power of the intended signal for the receiver device and N denotes the power of the noise received by the receiver device. The classification of an interferer as significant may be based on the potential improvement of the SINR if the interferer is removed. Suppose an interference from an interference source (network node in the downlink and wireless device in the uplink) is removed, this results in one less of the $I_x$ values, increasing the value of SINR. This increase can be compared with a threshold value to determine whether the interferer is significant. It is to be noted that as long as S and the various $I_x$ are known, this calculation can be performed without further measurements.

In the schedule transmissions step 42, transmissions are scheduled to avoid that the number of concurrent interfering streams at the receiver device exceeds the maximum number of interfering streams indicated by the parameter. In other words, the scheduling can involve scheduling streams within the network node itself or commanding other network nodes to schedule their streams.

In one embodiment, this comprises the use of ICIC as explained above. For example, using previously agreed blank or almost blank network resources, the network node can schedule the stream intended for the receiver device to avoid interferers of other ICIC network nodes.

In one embodiment, this step comprises reducing a rank of an interfering source to a reduced, non-zero rank. Rank is defined as the number of independent data streams bound for a user. In other words, rather than scheduling the entire user to another set of time-frequency resources, the rank can be reduced. This reduces the capacity of the interfering source, without eliminating it. The reduction of the rank is achieved by sending a signal to the network node being responsible for the interfering source in question commanding a reduction of the rank of the interference source in question.

In one embodiment, this step comprises reducing a rank of a stream intended for the receiver device to a reduced, non-zero rank. By reducing the rank of the intended stream, the ability to use interference suppression is improved, albeit at a cost of throughput of the stream intended for the receiver device.

When the receiver device is a wireless device, the scheduling thus comprises scheduling downlink transmissions to the wireless device. Optionally, the network node is not the serving network node transmitting streams intended for the receiver device.

When the receiver device is the network node performing the method, the scheduling thus comprises scheduling uplink transmissions from one or more wireless devices.

Figure 7B:
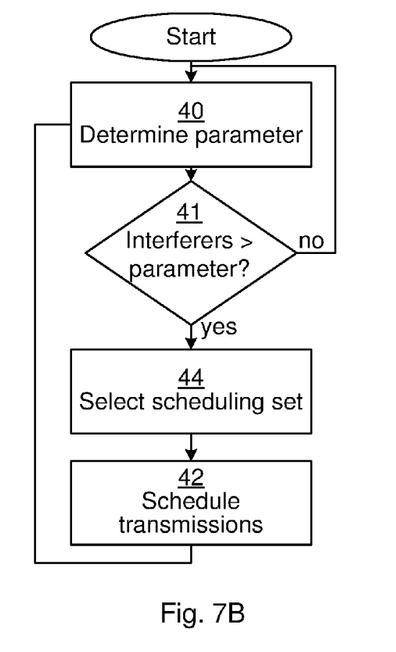

FIG. 7B is a flow chart illustrating a method for assisting handling of interference at a receiver device being either a network node or wireless device of FIGS. 1, 5 and 6, according to one embodiment. The method of FIG. 7B is similar to the method of FIG. 7A and only steps which are new of modified compared to the method of FIG. 7A are described here. As with the method illustrated in FIG. 7A, this method is executed for a particular receiver device and can be executed independently, in parallel, for a plurality of receiver devices.

Here, there is a select scheduling set step 44 before the schedule transmissions step 42. In this step, a scheduling set of at least one transmission stream is selected from the potentially interfering streams.

If there are n potentially interfering streams, using the terminology from above, for $d_{IRC}$ of these, interference suppression is likely successful at the receiver device. The group of n potentially interfering streams can then be divided into two set: an interference suppression set of $d_{IRC}$ streams and a scheduling set of (n-$d_{IRC}$) streams. Or at least, the scheduling set is explicitly defined, while the interference suppression set does not need to be explicitly defined.

By scheduling the streams of the scheduling set such that they do not interfere with the streams of the interference suppression set, the interference suppression is more successful.

As an example, in case the receiver device is equipped with two antennas, and there are two interfering streams and one stream intended for user U of the receiver device (single rank transmission), the degree of freedom for IRC, $d_{IRC}$, equals one (see [1] above). This implies that one interferer can be cancelled by IRC. The other interfering stream is then scheduled such that it does not interfere with the interferer which can be suppressed.

In one embodiment, streams are selected to the scheduling set based on which streams are less likely to be successfully cancelled at the receiver device. These streams are then scheduled such that they do not interfere with the intended stream. Remaining interfering streams are then left unchanged and are more likely to be successfully suppressed at the receiver device.

In one embodiment, at least one stream is selected to be part of the scheduling set, which stream has a signal strength that is weaker at the receiver device compared to other streams, but still strong enough to be a significant interferer. Alternatively or additionally, at least one stream is selected to be part of the scheduling set, which stream is transmitted from a source which is similar in direction from the receiver device compared to a source of streams intended for the receiver device. These types of streams are less likely to be successfully suppressed and are thus better to be part of the scheduling set.

In one embodiment, the selection is based on indications of performance gain from the receiver device.

In one embodiment, the selection is based on which streams have a lower priority. In such case, streams with lower priority are more likely to be included in the scheduling set, since these are allowed to be rescheduled. The priority can for example be indicated by a quality of service (QoS) indicator or similar.

Also, the schedule transmissions step 42 here comprises scheduling the at least one transmission stream in the scheduling set to avoid interference at the receiver device between the at least one transmission stream in the scheduling set with other streams of the potentially interfering streams.

Figure 8:
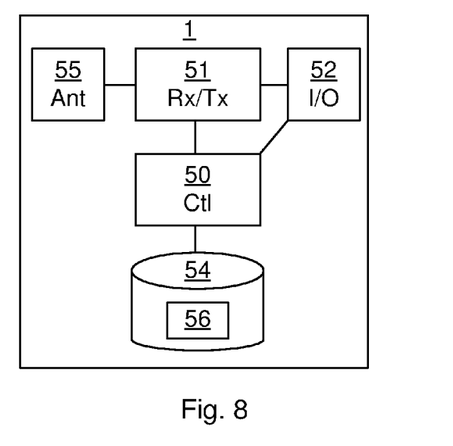
FIG. 8 is a schematic diagram showing some components of the network node of FIGS. 1, 5 and 6.

FIG. 8 is a schematic diagram showing some components of the network node 1 of FIGS. 1, 5 and 6. A processor 50 is provided using any combination of one or more of a suitable central processing unit (CPU), multiprocessor, microcontroller, digital signal processor (DSP), application specific integrated circuit etc., capable of executing software instructions 56 stored in a memory 54, which can thus be a computer program product. The processor 50 can be configured to execute the method described with reference to FIGS. 7A-B above.

The memory 54 can be any combination of read and write memory (RAM) and read only memory (ROM). The memory 54 also comprises persistent storage, which, for example, can be any single one or combination of magnetic memory, optical memory, solid state memory or even remotely mounted memory.

The network node 1 further comprises an I/O interface 52 for communicating with the core network and optionally with other network nodes.

The network node 1 also comprises one or more transceivers 51, comprising analogue and digital components, and a suitable number of antennas 55 (including at least two receive antennas) for radio communication with wireless devices within one or more radio cells, optionally using remote radio units and/or sectors. The processor 50 controls the general operation of the network node 1, e.g. by sending control signals to the transceiver 51 and receiving reports from the transceiver 51 of its operation. In one embodiment, the I/O interface 52 is directly connected to the transceiver 51, whereby data to and from the core network is directly routed between the I/O interface 52 and the transceiver 51.

Other components of the network node 1 are omitted in order not to obscure the concepts presented herein.

Figure 9:
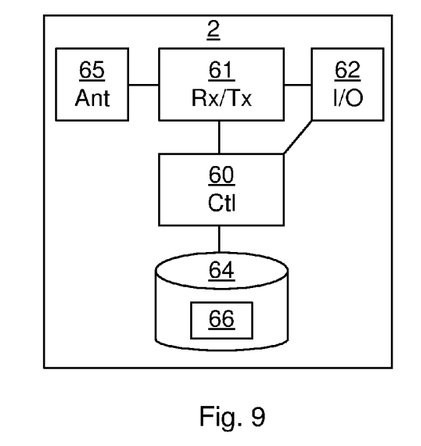
FIG. 9 is a schematic diagram showing some components of the wireless device of FIGS. 1, 5 and 6.

FIG. 9 is a schematic diagram showing some components of the wireless device 2 of FIGS. 1, 5 and 6. A processor 60 is provided using any combination of one or more of a suitable central processing unit (CPU), multiprocessor, microcontroller, digital signal processor (DSP), application specific integrated circuit etc., capable of executing software instructions 66 stored in a memory 64, which can thus be a computer program product.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

The wireless device 2 further comprises an I/O interface. The I/O interface can comprise a user interface including a display, input devices (keypads, touch sensitivity of the screen, etc.), speaker, microphone, etc.

The wireless device 2 also comprises one or more transceivers 61, comprising analogue and digital components, and a suitable number of antennas 65 (including at least two receive antennas) for radio communication with network nodes. The processor 60 controls the general operation of the wireless device 2, e.g. by sending control signals to the transceiver 61 and receiving reports from the transceiver 61 of its operation.

Other components of the wireless device 2 are omitted in order not to obscure the concepts presented herein.

Figure 10:
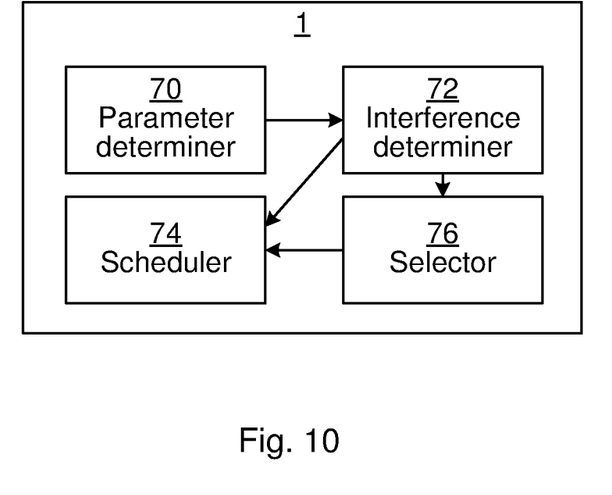
FIG. 10 is a schematic diagram showing functional modules of the network node of FIGS. 1, 5, 6 and 8.

FIG. 10 is a schematic diagram showing functional modules of the network node of FIGS. 1, 5, 6 and 8. The modules can be implemented using software instructions such as a computer program executing in the network node 1 and/or using hardware, such as application specific integrated circuits, field programmable gate arrays, discrete logical components, etc. The modules correspond to the steps in the methods illustrated in FIGS. 7A-B.

A parameter determiner 70 determines a parameter indicating a maximum number of interfering streams for which interference cancellation is likely to be successful at the receiver device. This module corresponds to the determine parameter step 40 of FIGS. 7A-B.

An interference determiner 72 determines when a number of potentially interfering streams at the receiver device exceeds the maximum number of interfering streams indicated by the parameter. This module corresponds to the conditional interferers>parameter step 41 of FIGS. 7A-B A scheduler 74 schedules transmissions to avoid that the number of concurrent interfering streams at the receiver device exceeds the maximum number of interfering streams indicated by the parameter. This module corresponds to the schedule transmissions step 42 of FIG. 7A-B.

A selector step 76 selects a set of at least one transmission stream from the potentially interfering streams. This module corresponds to the select scheduling set step 44 of FIGS. 7A-B.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for assisting handling of interference at a receiver device, the method being performed in a network node and comprising:
   determining a parameter indicating a number of streams intended for the receiver device subtracted from a number of receive antennas of the receiver device, wherein the receiver device comprises multiple receive antennas;
   determining that a number of potentially interfering streams at the receiver device exceeds the parameter;
   selecting a scheduling set of at least one transmission stream from the potentially interfering streams based on a suppressibility of the at least one transmission stream;
   responsive to the selecting, scheduling transmissions to avoid that number of concurrent interfering streams at the receiver device exceeding the parameter;
   wherein the scheduling comprises scheduling the at least one transmission stream in the scheduling set to avoid interference at the receiver device between the at least one transmission stream in the scheduling set with other streams of the potentially interfering streams.

2. The method of claim 1, wherein the selecting a scheduling set of at least one transmission stream comprises selecting at least one stream which has a weak signal at the receiver device compared to other streams and/or at least one stream which is transmitted from a source which is similar in direction from the receiver device compared to a source of streams intended for the receiver device.

3. The method of claim 1, wherein the selecting a scheduling set of at least one transmission stream comprises using indications of performance gain from the receiver device.

4. The method of claim 1, wherein the selecting a scheduling set of at least one transmission stream comprises selecting streams based on which streams have a lower priority.

5. The method of claim 1, wherein the scheduling comprises the use of inter-cell interference coordination.

6. The method of claim 1, wherein the scheduling transmissions comprises reducing a rank of an interfering source to a reduced, non-zero rank.

7. The method of claim 1:
wherein the receiver device is a wireless device; and
wherein the scheduling comprises scheduling downlink transmissions to the wireless device.

8. The method of claim 7, wherein the network node is distinct from any serving network node transmitting streams intended for the receiver device.

9. The method of claim 1:
wherein the receiver device is the network node; and
wherein the scheduling comprises scheduling uplink transmissions from a wireless device.

10. The method of claim 1, wherein determining that the number of potentially interfering streams at the receiver device exceeds the parameter comprises determining streams that are estimated to have a power level which is greater than a threshold power value.

11. A network node for assisting handling of interference at a receiver device, wherein the receiver device comprises multiple receiver antennas, the network node comprising:
a processor circuit;
memory storing instructions that, when executed by the processor circuit, causes the network node to:
determine a parameter indicating a number of streams intended for the receiver device subtracted from a number of receive antennas of the receiver device;
determine that a number of potentially interfering streams at the receiver device exceeds the parameter;
select a scheduling set of at least one transmission stream from the potentially interfering streams by selecting streams based on a suppressibility of the at least one transmission stream;
schedule transmissions to avoid that number of concurrent interfering streams at the receiver device exceeding the parameter, wherein the scheduling comprises scheduling the at least one transmission stream in the scheduling set to avoid interference at the receiver device between the at least one transmission stream in the scheduling set with other streams of the potentially interfering streams.

12. The network node of claim 11, wherein the instructions to select a set of at least one transmission stream comprise instructions to select at least one stream which has a weak signal at the receiver device compared to other streams and/or at least one stream which is transmitted from a source which is similar in direction from the receiver device compared to a source of streams intended for the receiver device.

13. The network node of claim 11, wherein the instructions to select a set of at least one transmission stream comprise instructions to use indications of performance gain from the receiver device.

14. The network node of claim 11, wherein the instructions to select a set of at least one transmission stream comprise instructions to select streams based on which streams have a lower priority.

15. The network node of claim 11, wherein the instructions to schedule comprise instructions to use inter-cell interference coordination.

16. The network node of claim 11, wherein the instructions to schedule transmissions comprise instructions to reduce a rank of an interfering source to a reduced, non-zero rank.

17. The network node of claim 11:
wherein the receiver device is a wireless device; and
wherein the instructions to schedule comprise instructions to schedule downlink transmissions to the wireless device.

18. The network node of claim 17, wherein the network node is distinct from any serving network node transmitting streams intended for the receiver device.

19. The network node of claim 11:
wherein the receiver device is the network node; and
wherein the instructions to schedule comprise scheduling uplink transmissions from a wireless device.

20. The network node of claim 11, wherein to determine that the number of potentially interfering streams at the receiver device exceeds the parameter, the instructions cause the network node to determine streams which are estimated to have a power level which is greater than a threshold power value.

* * * * *